Nov. 17, 1925.  
S. G. DOWN  
1,561,705  
BRAKE SHOE CONSTRUCTION  
Filed Dec. 7, 1923
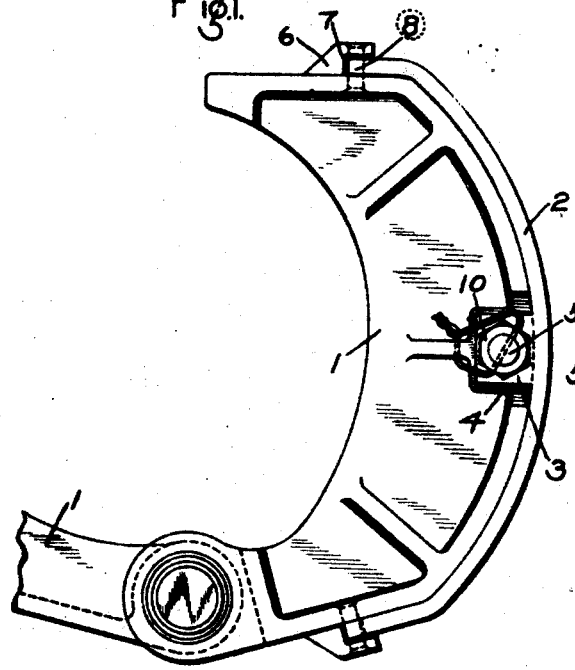
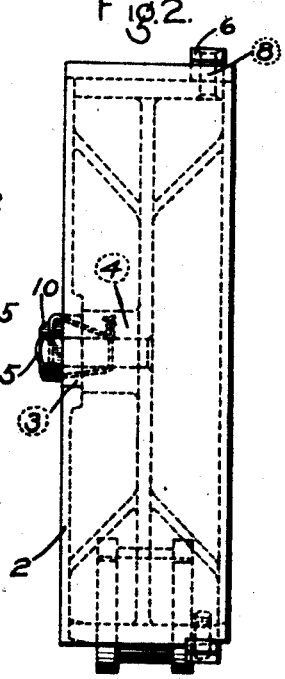
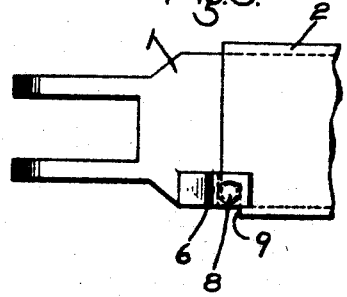
INVENTOR  
SIDNEY G. DOWN  
BY Wm. M. Cady  
ATTORNEY Patented Nov. 17, 1925.

1,561,705

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-SHOE CONSTRUCTION.

Application filed December 7, 1923. Serial No. 679,232.

*To all whom it may concern:*

Be it known that I, SIDNEY G. DOWN, a citizen of the United States, residing at Pittsburgh, in the county of Allegheny and State of Pennsylvania, have invented new and useful Improvements in Brake-Shoe Constructions, of which the following is a specification.

This invention relates to brake shoes and more particularly to a brake shoe construction adapted for the internal expanding drum type of brake such as employed on motor vehicles.

The principal object of my invention is to provide an improved brake shoe construction of the above character.

In the accompanying drawing; Fig. 1 is a side elevational view of a brake head, showing my improved brake shoe construction applied thereto; Fig. 2 an end elevation of the construction shown in Fig. 1; and Fig. 3 a fragmentary view, showing in plan one of the end securing means for the brake shoe.

The brake head 1, as shown in the drawing, is provided with an arcuate face adapted to receive a metal brake shoe 2. According to my invention the brake shoe 2 is provided intermediate its ends with an inwardly extending radial lug 3. Said lug is adapted to engage a central raised portion 4 of the brake head 1 and said raised portion is apertured to receive a clamping bolt 5 which extends through an opening in the lug 3.

At each end of the arcuate face, the brake shoe receiving face of the brake head 1 is deflected inwardly from the plane of the arcuate face and the opposite ends of the brake shoe 2 are bent inwardly so as to engage the inwardly deflected end portions. At one side of the brake head and at each of the opposite ends an integral lug 6 is provided, having a transverse slot 7 adapted to receive the corresponding end of the brake shoe 2. A rivet 8 extends across the slot 7 and the brake shoe 2 is provided with a notch 9 at each end for receiving the rivet 8 to permit the brake shoe to occupy its position on the brake head and at the same time provide a stop for maintaining the shoe in its proper position on the brake head.

The brake shoe 2 is applied to the brake head 1 by an axial movement with respect to the brake head and when in position, the notches 9 engage the rivets 8 and the lug 3 engages the face of the raised portion 4 of the brake head 1. A nut 10 is then applied to the bolt 5 and the shoe 2 is clamped to the brake head by screwing up the nut, so that only a single securing means is required.

The ends of the brake shoe being disposed in the slots 7, the shoe is prevented from lifting, and since the ends of the brake shoe are turned inwardly from the arcuate face of the brake head, the end portions of the brake shoe will not be subjected to wear through frictional engagement of the brake shoe with the interposed friction face of the brake drum.

Having now described my invention, what I claim as new and desire to secure by Letters Patent, is:—

1. The combination with a brake head having an arcuate face, of a brake shoe engaging said face and provided with a single inwardly extending lug at one side of the brake shoe and disposed centrally of the ends of the brake shoe and means for securing said lug to the brake head.

2. The combination with a brake head having an arcuate face, of a brake shoe engaging said face and provided with an inwardly extending centrally disposed lug, means for securing said lug to the brake head, transversely slotted lugs on the brake head for receiving the opposite ends of the brake shoe, and pins associated with said lugs for engaging notches in said brake shoe.

In testimony whereof I have hereunto set my hand.

SIDNEY G. DOWN.